United States Patent [19]
Liu et al.

[11] Patent Number: 6,019,412
[45] Date of Patent: Feb. 1, 2000

[54] SEAT ASSEMBLY

[75] Inventors: Frank Qiukui Liu, Canton; Majid Hammoud, Plymouth; Leon B. Liu, Novi, all of Mich.

[73] Assignee: Ford Motor Company, Dearborn, Mich.

[21] Appl. No.: 09/186,295

[22] Filed: Nov. 5, 1998

[51] Int. Cl.[7] .................................................. B60N 2/06
[52] U.S. Cl. ................................. 296/65.13; 296/65.16
[58] Field of Search .............................. 296/65.13, 65.16

[56] References Cited

U.S. PATENT DOCUMENTS

| | | |
|---|---|---|
| 4,209,159 | 6/1980 | Becker et al. . |
| 4,262,963 | 4/1981 | Bauer et al. . |
| 4,530,540 | 7/1985 | Hayden et al. . |
| 4,685,716 | 8/1987 | Kondo . |
| 5,137,244 | 8/1992 | Negi . |
| 5,570,931 | 11/1996 | Kargilis et al. ....................... 296/65.13 |

FOREIGN PATENT DOCUMENTS

| | | |
|---|---|---|
| 3111681 | 7/1982 | Germany . |
| 558957 | 1/1980 | Japan . |

Primary Examiner—Gary C. Hoge
Attorney, Agent, or Firm—David B. Kelley

[57] ABSTRACT

A seat assembly for a motor vehicle includes a generally horizontal seat portion and a generally upright back portion operatively connected to the seat portion. The seat assembly also includes at least one track operatively connected to the seat portion and vehicle structure and a pivot bracket operatively connected to the back portion and the seat portion. The seat assembly further includes a reinforcement bracket disposed between the pivot bracket and the at least one track and operatively connected to the pivot bracket and the vehicle structure for reinforcing the at least one track.

20 Claims, 2 Drawing Sheets

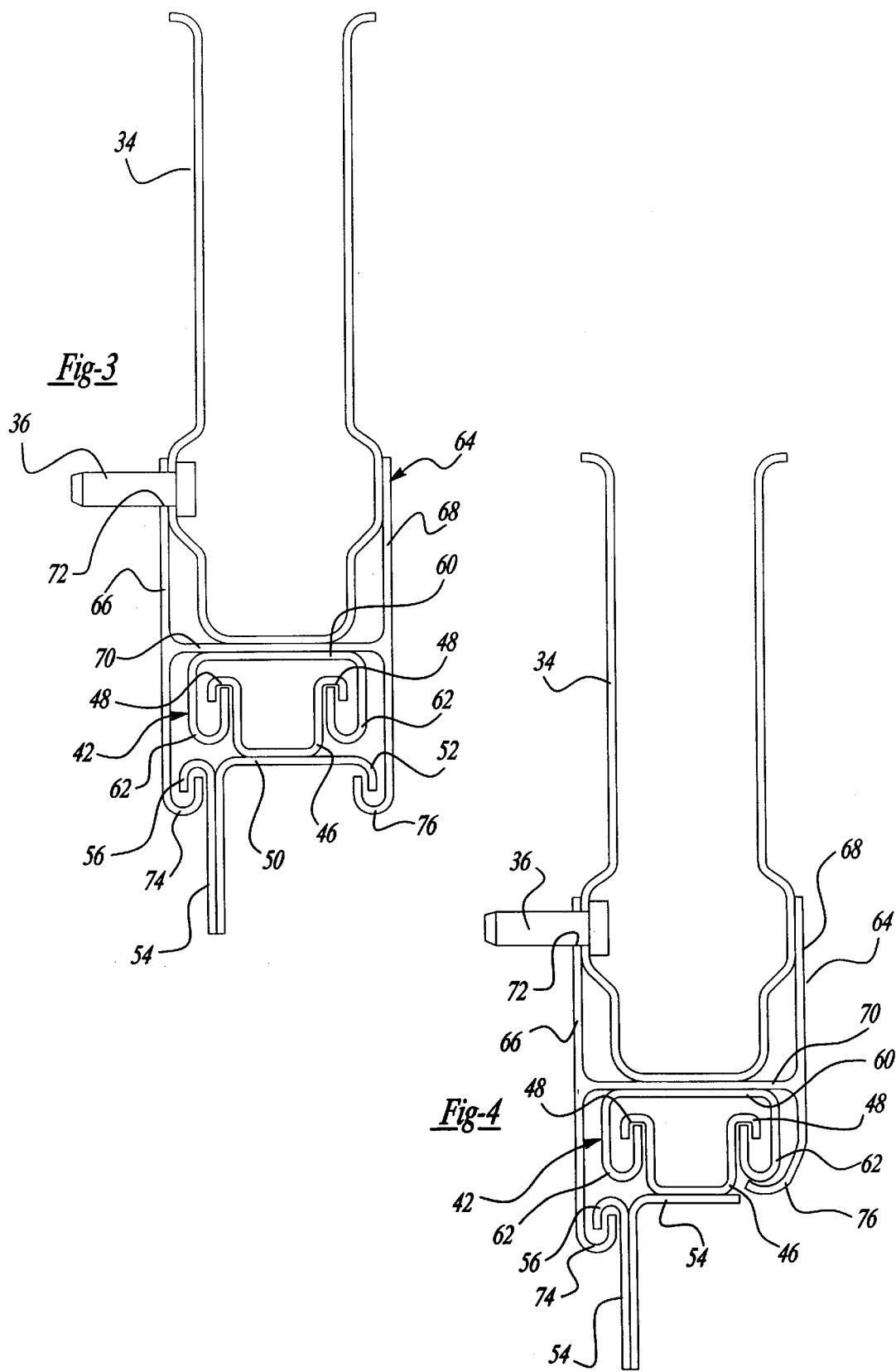

SEAT ASSEMBLY

BACKGROUND OF THE INVENTION

1. Field of the Invention

The present invention relates generally to seats for motor vehicles and, more specifically, to a seat assembly for a motor vehicle.

2. Description of the Related Art

It is known to provide seats for motor vehicles such as an automotive vehicle. Typically, a seat includes a generally horizontal seat portion and a generally vertical back portion operatively connected to the seat portion. The seat may include at least one, preferably a pair of tracks to allow longitudinal adjustment of the seat portion. The tracks are spaced laterally and extend longitudinally and are secured to vehicle structure such as a seat riser by suitable means such as welding. The seat may include a seat integrated restraint (SIR) seating system to restrain an occupant in the seat.

Although the above seats have worked well, they suffer from the disadvantage that the tracks may not be strong enough to hold the belt load for the occupant. Another disadvantage is that the track may be made thicker or reinforced using stamped brackets to hold the belt load, resulting in increased manufacturing and assembly complexity, higher cost and increased weight.

SUMMARY OF THE INVENTION

Accordingly, the present invention is a seat assembly for a motor vehicle including a generally horizontal seat portion and a generally upright back portion operatively connected to the seat portion. The seat assembly also includes at least one track operatively connected to the seat portion and vehicle structure. The seat assembly includes a pivot bracket operatively connected to the back portion and the seat portion. The seat assembly further includes a reinforcement bracket disposed between the pivot bracket and the at least one track and operatively connected to the pivot bracket and the vehicle structure for reinforcing the at least one track.

One advantage of the present invention is that an improved seat assembly is provided for a motor vehicle. Another advantage of the present invention is that a seat assembly is provided with an extruded J-hook reinforcement bracket for the seat tracks. Yet another advantage of the present invention is that a seat assembly is provided in which several reinforcements for the seat tracks are combined into one single piece J-hook reinforcement bracket. Still another advantage of the present invention is that a seat assembly is provided in which load-bearing capability of conventional seat tracks is increased dramatically and the number of components required to reinforce conventional seat tracks is minimized. A further advantage of the present invention is that the seat assembly significantly reduces manufacturing and assembly complexity, thus reducing cost and weight.

Other features and advantages of the present invention will be readily appreciated as the same becomes better understood after reading the subsequent description when taken in conjunction with the accompanying drawings.

BRIEF DESCRIPTION OF THE DRAWINGS

FIG. 3 is an enlarged view of a portion of the seat assembly of FIG. 2.

FIG. 4 is an enlarged view of another embodiment, according to the present invention, of a portion of the seat assembly of FIG. 2.

DESCRIPTION OF THE PREFERRED EMBODIMENT(S)

Figure 1:
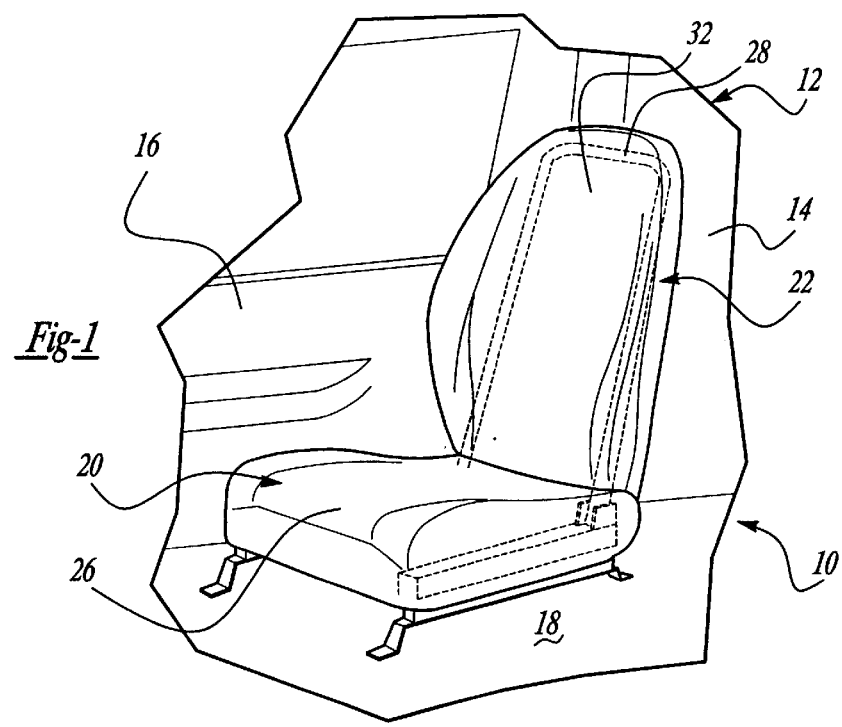
FIG. 1 is a perspective view of a seat assembly, according to the present invention, illustrated in operational relationship with a motor vehicle.
Figure 2:
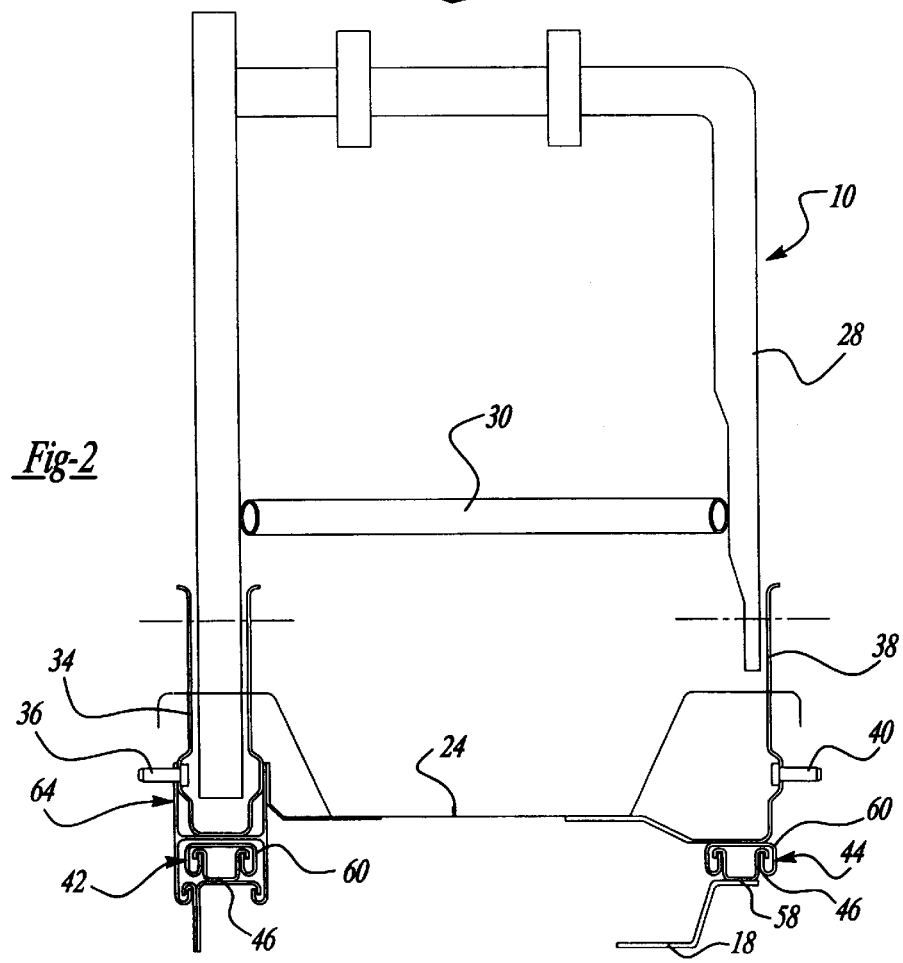
FIG. 2 is a rear elevational view of the seat assembly of FIG. 1.

Referring now to the drawings and in particular FIG. 1 and 2, one embodiment of a seat assembly 10, according to the present invention, is shown for a motor vehicle, generally indicated at 12. The motor vehicle 12 includes a body 14 forming an occupant compartment 16. The body 14 further includes a floorpan 18 forming an underbody or floor of the occupant compartment 16. To that end, the seat assembly 10 is disposed within the occupant compartment 16 and operatively connected to the floorpan 18 as will be described. Although the seat assembly 10 is shown for a single occupant, the seat assembly 10 can also be for a two and three occupant bench seat.

The seat assembly 10 includes a generally horizontal seat portion or seat cushion 20 and a generally upright seat back or back portion 22 pivotally connected to the seat cushion 20. The seat cushion 20 includes a seat pan 24 and a cushion 26 operatively connected to the seat pan 24 by suitable means such as an adhesive. The seat back 22 includes a seat back frame 28. The seat back frame 28 has a generally inverted "U" shape. The seat back frame 28 is made of a rigid material such as metal and is a tubular member. The seat back frame 28 may include a support member 30 extending laterally thereacross. The seat back 22 also includes a cushion 32 disposed about and operatively connected to the seat back frame 28 by suitable means such as an adhesive.

Referring to FIGS. 2 and 3, the seat assembly 10 includes a seat pivot bracket 34. The seat pivot bracket 34 is generally "U" shape. The seat pivot bracket 34 is pivotally connected by suitable means such as fasteners (not shown) to a left-hand side of the seat back frame 28. The seat pivot bracket 34 includes an attachment member 36 extending laterally through an aperture on an outer side thereof for attachment to a seat belt restraint (not shown). The attachment member 36 is generally cylindrical in shape and secured to the seat pivot bracket 34 by suitable means such as welding. It should be appreciated that the seat back frame 28 pivots relative to the seat pivot bracket 34.

The seat assembly 10 includes a seat pivot bracket 38. The seat pivot bracket 38 is generally "L" shape. The seat pivot bracket 38 is connected to the seat pan 24 by suitable means such as welding. The seat pivot bracket 38 is pivotally connected by suitable means such as fasteners (not shown) to a right-hand side of the seat back frame 28. The seat bracket 38 includes an attachment member 40 extending laterally through an aperture thereof for attachment to a seat belt restraint (not shown). The attachment member 40 is generally cylindrical in shape and secured to the seat bracket 38 by suitable means such as welding. It should be appreciated that the seat back frame 28 pivots relative to the seat pivot bracket 38.

The seat assembly 10 also includes at least one, preferably a pair of tracks, generally indicated at 42 and 44, connected to vehicle structure. The tracks 42 and 44 are spaced longitudinally and extend laterally. Each track 42 and 44 includes a lower track member 46. The lower track member 46 is generally "U" shaped with a flange 48 at each upper end having an inverted general "J" shape for a function to be described. The lower track member 46 for the track 42 is connected to an outboard seat riser 50 of the floorpan 18 by suitable means such as welding. The seat riser 50 has an inverted general "L" shape and may have a flange 52 down-turned at a lateral end thereof for a function to be described. The seat riser 50 may also include a support member 54 connected thereto by suitable means such as welding. The support member 54 has a flange 56 at an upper end thereof having an inverted general "J" shape for a function to be described. The lower track member 46 for the track 44 is connected to an inboard seat riser 58 of the floorpan 18 by suitable means such as welding. The seat riser 58 has an inverted general "L" shape.

Each track 42 and 44 also includes an upper track member 60 to slide along the lower track member 46. The upper track member 60 has an inverted general "U" shape with a flange 62 at each lower end having a general "J" shape. The flange 62 overlaps the flange 48 and slides relative thereto. The track members 46 and 60 are made of a rigid material such as metal. The upper track member 60 for the track 44 is connected to the seat pivot bracket 38 by suitable means such as welding. The upper track member 60 of the track 42 is connected to a reinforcement bracket to be described. It should be appreciated that the tracks 42 and 44 are conventional and known in the art.

The seat assembly 10 includes a reinforcement bracket, generally indicated at 64, interconnecting the seat pivot bracket 34 and the outboard seat riser 50. The reinforcement bracket 64 has a generally planar outer wall 66 and an inner wall 68 spaced laterally from the outer wall 66 and an interior wall 70 extending laterally between the inner wall 68 and the outer wall 66. The interior wall 70 is secured to the seat pivot bracket 34 and upper track member 60 by suitable means such as welding. The inner wall 68 is secured to the seat pivot bracket 34 and seat pan 24 by suitable means such as welding. The outer wall 66 includes an aperture 72 extending therethrough for receiving the attachment member 36. The outer wall 66 is secured to the seat pivot bracket 34 by suitable means such as welding.

The outer wall 66 and the inner wall 68 have a flange 74 and 76, respectively, at their lower end with a general "J" shape. The flange 74 overlaps the flange 56 of the support member 54 of the outboard seat riser 50. The flange 76 overlaps the flange 52 of the outboard seat riser 50. As illustrated in another embodiment in FIG. 4, the flange 76 on the inner wall 68 may overlap the flange 62 of the upper track member 60. It should be appreciated that the flange 74 and 76 slide relative to the flanges 56 and 52, respectively.

The reinforcement bracket 64 is extruded of a rigid material such as metal. The outer wall 66, inner wall 68 and interior wall 70 are integral, unitary and formed as one-piece. It should be appreciated that the reinforcement bracket 64 slides relative to the seat riser 50.

Accordingly, the reinforcement bracket 64 is used to reinforce the seat track 42 as well as the seat pivot bracket 34 or other components. The reinforcement bracket 64 increases the load-bearing capability of conventional seat tracks. As a result, the seat assembly 10 requires fewer components to reinforce the seat tracks. Further, the manufacturing and assembly complexity of the seat assembly 10 is reduced significantly.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat assembly for a motor vehicle comprising:
    a generally horizontal seat portion;
    a generally upright back portion operatively connected to said seat portion;
    at least one track operatively connected to said seat portion and vehicle structure;
    a pivot bracket operatively connected to said back portion and said seat portion; and
    a reinforcement bracket disposed between said pivot bracket and said at least one track and operatively connected to said pivot bracket and the vehicle structure for reinforcing said at least one track.

2. A seat assembly as set forth in claim 1 wherein said at least one track comprises a lower track member and an upper track member slidably engaging said lower track member.

3. A seat assembly as set forth in claim 2 wherein said reinforcement bracket is an extruded member.

4. A seat assembly as set forth in claim 2 wherein said back portion includes a frame connected to said pivot bracket.

5. A seat assembly as set forth in claim 2 wherein said pivot bracket includes an attachment member extending therefrom.

6. A seat assembly as set forth in claim 5 wherein said reinforcement bracket includes an outer wall and an inner wall spaced laterally from said outer wall, said attachment member extending through said outer wall.

7. A seat assembly as set forth in claim 6 wherein said reinforcement bracket includes an interior wall extending between said outer wall and said inner wall and disposed between said pivot bracket and said upper track member.

8. A seat assembly as set forth in claim 7 wherein said outer wall includes a flange at a lower end thereof having a J shape to overlap a corresponding inverted J shape of the vehicle structure.

9. A seat assembly as set forth in claim 7 wherein said inner wall includes a flange at a lower end thereof having a J shape to overlap a corresponding inverted J shape of the vehicle structure.

10. A seat assembly as set forth in claim 7 wherein said inner wall includes a flange at a lower end thereof having a J shape to overlap a corresponding J shape to overlap a corresponding J shape of said upper track member.

11. A seat assembly for a motor vehicle comprising:
    a seat portion;
    a back portion operatively connected to said seat portion;
    a pair of tracks extending longitudinally and spaced laterally and operatively connected to said seat portion;
    a pivot bracket operatively connected to said back portion and said seat portion; and
    an extruded reinforcement bracket disposed between said pivot bracket and one of said tracks and operatively connected to said pivot bracket and vehicle structure for reinforcing the one of said tracks.

12. A seat assembly as set forth in claim 11 wherein each of said tracks comprises a lower track member and an upper track member slidably engaging said lower track member.

13. A seat assembly as set forth in claim 11 wherein said seat portion includes a seat pan and a seat cushion connected to said seat pan.

14. A seat assembly as set forth in claim 11 wherein said back portion includes a frame connected to said pivot bracket.

15. A seat assembly as set forth in claim 12 wherein said pivot bracket includes an attachment member extending therefrom.

16. A seat assembly as set forth in claim 15 wherein said reinforcement bracket includes an outer wall and an inner wall spaced laterally from said outer wall, said attachment member extending through said outer wall.

17. A seat assembly as set forth in claim 16 wherein said reinforcement bracket includes an interior wall extending between said outer wall and said inner wall and disposed between said pivot bracket and said upper track member.

18. A seat assembly as set forth in claim 16 wherein said outer wall includes a flange at a lower end thereof having a J shape to overlap a corresponding inverted J shape of the vehicle structure.

19. A seat assembly comprising:

a generally horizontal seat portion;

a generally upright back portion operatively connected to said seat portion;

a pair of tracks extending longitudinally and spaced laterally;

a pivot bracket operatively connected to said back portion and said seat portion; and an extruded J-hook reinforcement bracket having an outer wall operatively connected to said pivot bracket and vehicle structure and an inner wall spaced laterally from said outer wall and operatively connected to said pivot bracket and the vehicle structure and an interior wall extending between said outer wall and said inner wall and disposed between said pivot bracket and one of said tracks for reinforcing the one of said tracks.

20. A seat assembly as set forth in claim 19 wherein said outer wall includes a flange at a lower end thereof having a J shape to overlap a corresponding inverted J shape of the vehicle structure and said inner wall includes a flange at a lower end thereof having a J shape to overlap a corresponding inverted J shape of either one of the vehicle structure and one of said tracks to reinforce the one of said tracks.

* * * * *